US011733017B2

(12) United States Patent
Weskamp et al.

(10) Patent No.: US 11,733,017 B2
(45) Date of Patent: Aug. 22, 2023

(54) TOURNAMENT FISHING MEASUREMENT SYSTEM DEVICE AND METHOD (71) Applicant: Ketch Products, Inc., East Dundee, IL (US)

(72) Inventors: Robert Weskamp, Barrington Hills, IL (US); Eric Peterson, Genoa, IL (US)

(73) Assignee: Ketch Products, Inc., East Dundee, IL (US)

( * ) Notice: Subject to any disclaimer, the term of this patent is extended or adjusted under 35 U.S.C. 154(b) by 31 days.

(21) Appl. No.: 17/535,991

(22) Filed: Nov. 27, 2021

(65) Prior Publication Data
US 2022/0082366 A1 Mar. 17, 2022

Related U.S. Application Data (63) Continuation-in-part of application No. 16/352,357, filed on Mar. 13, 2019, now Pat. No. 11,357,222.

(51) Int. Cl.
*G01B 3/08* (2006.01)
*A01K 97/00* (2006.01)
(52) U.S. Cl.
CPC ............... *G01B 3/08* (2013.01); *A01K 97/00* (2013.01)
(58) Field of Classification Search
USPC ............................................. 33/511
See application file for complete search history.

(56) References Cited

U.S. PATENT DOCUMENTS

| 3,259,988 | A | * | 7/1966 | Lunn | A01K 97/00 |
| | | | | | D10/70 |
| 5,148,607 | A | * | 9/1992 | Lasiter | G01B 3/04 |
| | | | | | D10/70 |
| 5,339,532 | A | * | 8/1994 | O'Keefe | A01K 61/90 |
| | | | | | D10/70 |
| 5,526,575 | A | * | 6/1996 | Hoover | G01B 3/02 |
| | | | | | 33/549 |
| 6,594,939 | B2 | * | 7/2003 | Ondusko | A01K 97/00 |
| | | | | | 33/511 |
| 7,605,332 | B2 | * | 10/2009 | Winkler | A01K 97/08 |
| | | | | | 340/573.2 |
| 8,478,814 | B2 | * | 7/2013 | Shafter | G06F 17/40 |
| | | | | | 705/500 |
| 10,598,474 | B1 | * | 3/2020 | Petrash | G01B 3/002 |
| 11,357,222 | B2 | * | 6/2022 | Weskamp | G01B 3/06 |
| 2011/0192046 | A1 | * | 8/2011 | Kinziger | A01K 97/20 |
| | | | | | 33/759 |
| 2011/0208479 | A1 | * | 8/2011 | Chaves | A01K 97/00 |
| | | | | | 702/187 |
| 2017/0000099 | A1 | * | 1/2017 | Wanke | A01K 97/00 |

FOREIGN PATENT DOCUMENTS

KR 101470917 B1 * 12/2014 ............... G01B 3/08

* cited by examiner

*Primary Examiner* — Christopher W Fulton (57) ABSTRACT

A fish measurement device including a rigid bump board in combination with a slidably engageable assembly and a method for verification of fish measurement when using the device. The assembly design having the capability to mount the board to an underlying support surface as well as provide a user identifier for use in fishing tournaments.

13 Claims, 13 Drawing Sheets

TOURNAMENT FISHING MEASUREMENT SYSTEM DEVICE AND METHOD

CROSS-REFERENCE TO RELATED APPLICATION

This Continuation-In-Part Patent Application claims the benefit of U.S. Pat. No. 11,357,222 filed Mar. 13, 2019, which is hereby incorporated by reference in its entirety herein.

BACKGROUND OF THE INVENTION

I. Field of the Invention

The present disclosure relates generally to systems, devices and methods for measuring fish, and more specifically to a rigid bump board with a slidably engageable cradle, support mount, and user identification, and a method for verification of tournament fishing measurement.

II. Description of the Prior Art

The ability to accurately measure fish has numerous applications. Most common of which is being able to substantiate the fisherman's "story". A more substantial reason to obtain fish size is that many jurisdictions require fish of a certain species to be a minimum length to be kept, otherwise the fish must be returned to the water unharmed. Such minimum length regulations are particularly common for fresh water game fish such as walleye, northern pike, muskellunge, trout, bass, perch and the like. Furthermore, certain species also have an upper length limit to ensure the sustainability of the species. These upper and lower length specifications create a so-called "Slot Limit" for certain species of both fresh water and salt water species. Sport fishers therefor commonly need to measure the length of a caught fish to know whether the fish may be kept or must be returned to the water.

A further reason for accurate measurement of fish length, and one for which the present disclosure is well suited, is during fishing tournaments. Conventional bass tournaments, for example, require the angler to keep the fish in a so-called "live-well" in their boat until the day of fishing is over. At which time they are transported to a central weigh/measurement station, perhaps many hours after they have been caught. Fish mortality in these conventional bass tournament circuits are alarmingly high. Mishandling, oxygen deprivation, high water temperatures and high ammonia or carbon dioxide result in dead fish at the weigh-in scales. Many more die following their release due to oxygen debt, toxins in the bloodstream and infections. Indeed, total fish death at such tournaments approach the 50% rate.

In any event, common devices used for measuring the length of a caught fish include, for example, i) using a cloth, metallic or plastic measuring tape; ii) using a stick or other rigid elongate object having a distance measuring marks; iii) placing the fish in an elongate U-shaped half tube having a cap at one end and distance measuring marks inside the U-shaped portion extending away from the cap; and iv) using a so-called bump board. The present disclosure is a unique and novel advancement to bump boards.

Conventional bump boards are typically formed as an elongated rectangular substrate with ruled markings and include one or more bumps that project upwardly from the place of the elongated substrate. In use, the fish head-end is held firmly against the head bump and measurements of length are taken from the fish tail-end against the markings.

While prior art bump boards are widely considered the best devices to measure fish length, particularly during tournaments, they nevertheless have their shortcomings. For example, numerous designs are formed via some type of plastic and thus become brittle after limited use. Additionally, many bump boards are flexible and accordingly are susceptible to flexing and thus (purposeful) mismeasurements (i.e. cheating).

Even CPR tournaments have been susceptible to cheating techniques. By way of background, CPR stands for Catch, Photo, Release. In almost all CPR tournaments, length rather than weight is the basis for each competitor's catch. Essentially, a contestant catches a fish, lays it against an approved measuring board, and takes a photo using a digital camera or smart phone, etc. The photo is then uploaded to a server using a web browser, app or the like to a web-based Tournament Management System ("TMS"). Use of a smartphone captures time and geolocation information in the META data of each photo. The fish is then returned to the water, unharmed, after having been photographed. As handling and time out of water are minimized, the mortality rate for CPR tournaments are a fraction of conventional weight-based tournaments where fish are transported in live-wells, other holding tanks and even bags.

The TMS displays each event's photos on a website leader board. The number of fish per contestant can vary from one to five or more per day, depending on the event rules. As a contestant catches successive fish and photos are uploaded, photos of shorter fish are replaced so only the highest-scoring fish remain at the end. At the end of competition time, the cumulative length of bass (for example) for each contestant determines their ranking on the leader board. Unfortunately, it has been discovered that some anglers have been able to flex their board and/or use modified and/or imposter boards (i.e. cheat) during such CPR events.

The present disclosure overcomes the problems associated with the aforementioned, conventional fish measuring devices and methods. Accordingly, it is a general object of this disclosure to provide an improved fishing measurement device and method.

It is another general object of the present disclosure to provide a rigid fish measuring device that prevents flexing and inaccurate measurements.

It is a more specific object of the present disclosure to provide a fish measuring device that includes extended and curved sides for support of larger fish.

It is another more specific object of the present disclosure to provide a hinged rigid fish measuring device with a cradle for accurate measurement of longer and larger fish.

It is yet another more specific object of the present disclosure to provide a fish measurement device and method that allows verification and authentication of every measurement.

Still another object of the present disclosure is to provide a fish measurement system, device and method that mounts to an underlying support surface.

It is still another object of the present disclosure to provide a fish measurement system, device and method having a position-able tournament identification.

These and other objects, features and advantages of this disclosure will be clearly understood through a consideration of the following detailed description.

SUMMARY OF THE INVENTION

According to an embodiment of the present disclosure, there is provided a system for measuring fish including a board having ruled markings disposed on a top surface and a bump having a front side perpendicularly positioned and aligned with a zero marking. The board having a first cross-sectional dimension. A position-able assembly having a second cross-sectional dimension larger than the first dimension.

According to another embodiment of the present disclosure, there is provided a system for measuring fish including a board having ruled markings disposed on a top surface and a bump having a front side perpendicularly positioned and aligned with a zero marking. The board having a first cross-sectional dimension. A position-able mount assembly having a second cross-sectional dimension larger than the first dimension and a mounting assembly for mounting upon an underlying support surface.

According to another embodiment of the present disclosure, there is provided a system for measuring fish including a board having ruled markings disposed on a top surface and a bump having a front side perpendicularly positioned and aligned with a zero marking. The board having a first cross-sectional dimension. A position-able user identifier having a second cross-sectional dimension larger than the first dimension.

BRIEF DESCRIPTION OF THE DRAWINGS

The present disclosure will be more fully understood by reference to the following detailed description of one or more preferred embodiments when read in conjunction with the accompanying drawings, in which like reference characters refer to like parts throughout the views and in which.

DESCRIPTION OF THE PREFERRED EMBODIMENTS

One or more embodiments of the subject disclosure will now be described with the aid of numerous drawings. Unless otherwise indicated, use of specific terms will be understood to include multiple versions and forms thereof.

Figure 1:
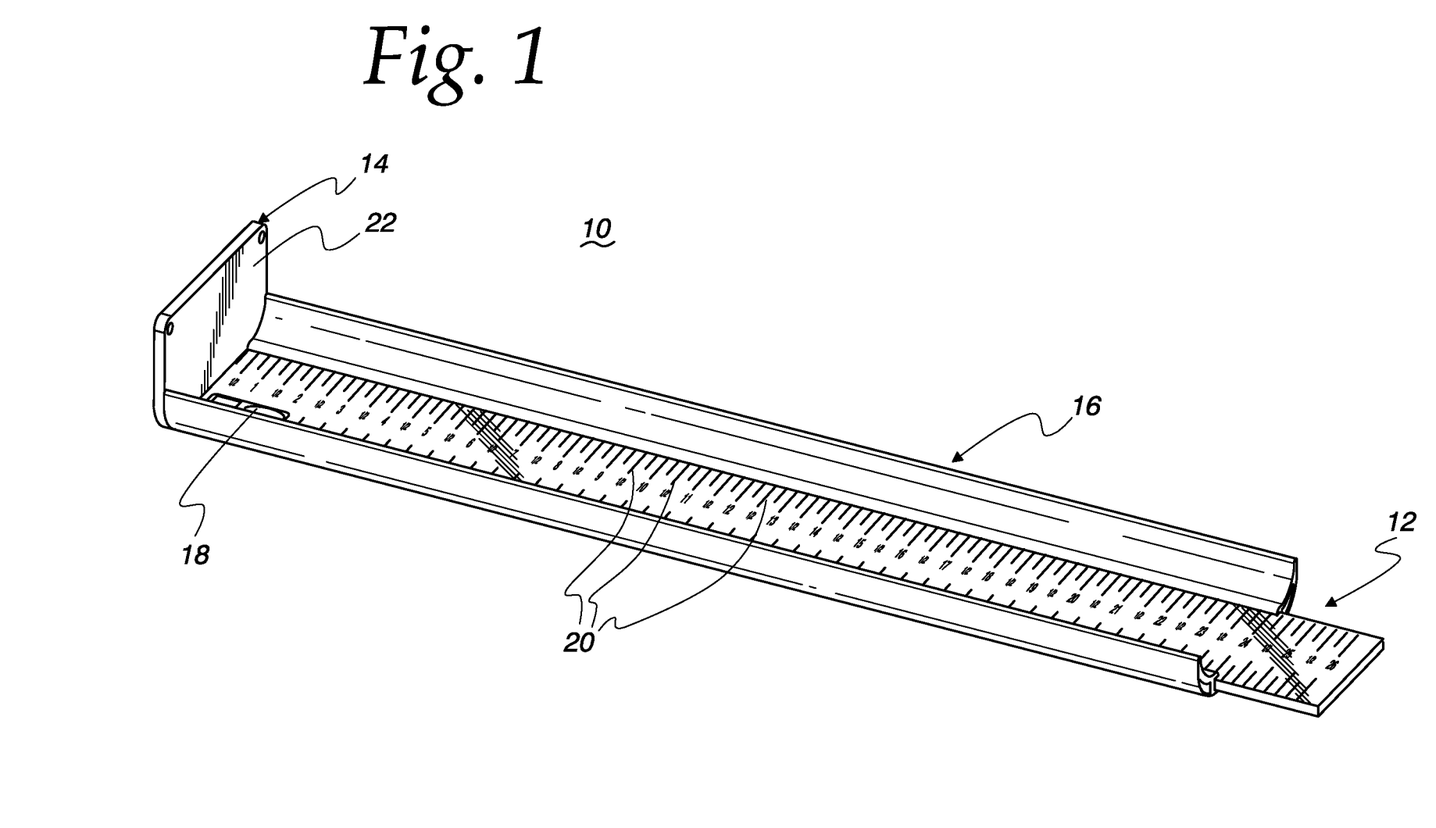
FIG. 1 is a perspective view of the fish measurement device according to the principles of an embodiment of the present disclosure.

Turning now to the figures, and in particular FIG. 1, an embodiment of the fish measuring device 10 is illustrated in the perspective view. The main component parts of the device 10 includes the elongated rectangular board 12, the bump or fence 14 and the curved side supports or cradle 16. The method of tournament fishing measurement further includes the QR tab 18 component.

The board 12 is rigid and preferably metallic, and in some embodiments, aluminum in composition. The ruled markings 20 are similar to a ruler with preferably laser or machine engraved lines every 0.250", although it will be appreciated that the method and distance of such markings can be of any reasonable variety. The bump 14 stop is affixed to the board 12 with flush rivets, dowel pins, screws, or the like. It will also be appreciated that, so long as the face 22 of the bump aligns flush and perpendicular with the zero markings of the board, any suitable fastening means may be used.

Figures 2, 3A, 3B:
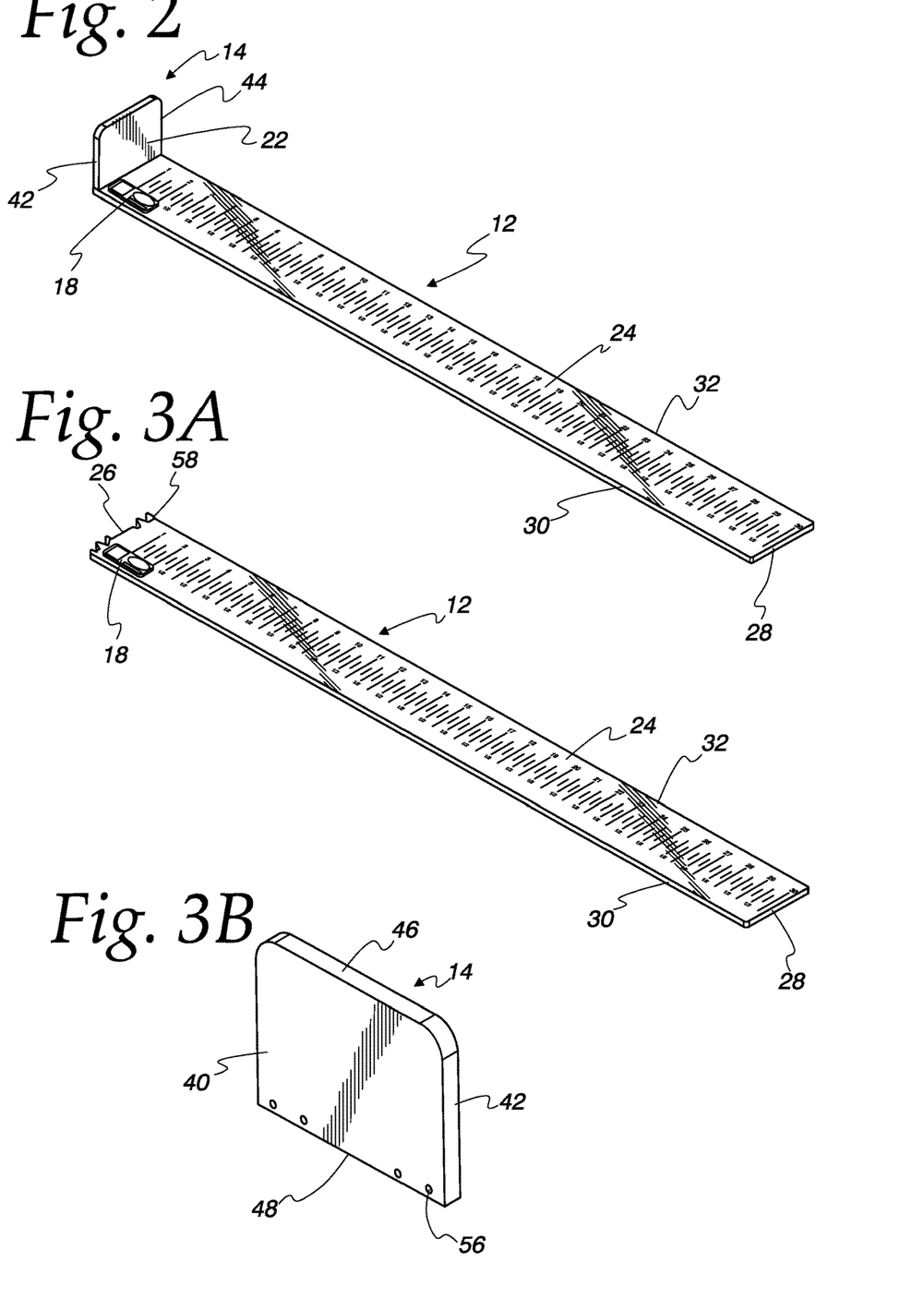
FIG. 2 is a perspective view of the board and bump components of the fish measuring device of FIG. 1.
FIG. 3A is a perspective view of the board component of the fish measuring device of FIG. 1.
FIG. 3B is a reversed perspective view of the bump component of the fish measuring device of FIG. 1.
Figure 4A:
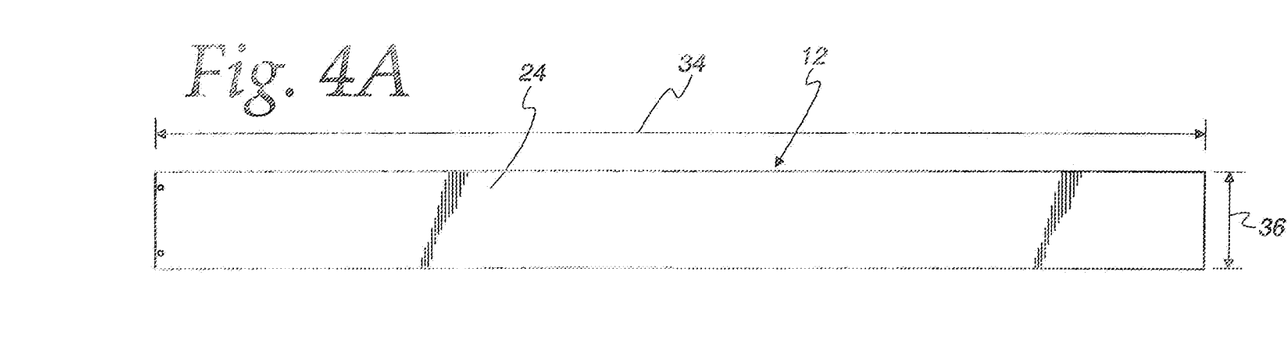
FIG. 4A is a top plan view of the board component of the fish measuring device of FIG. 1.
Figures 4B, 4C, 4D:
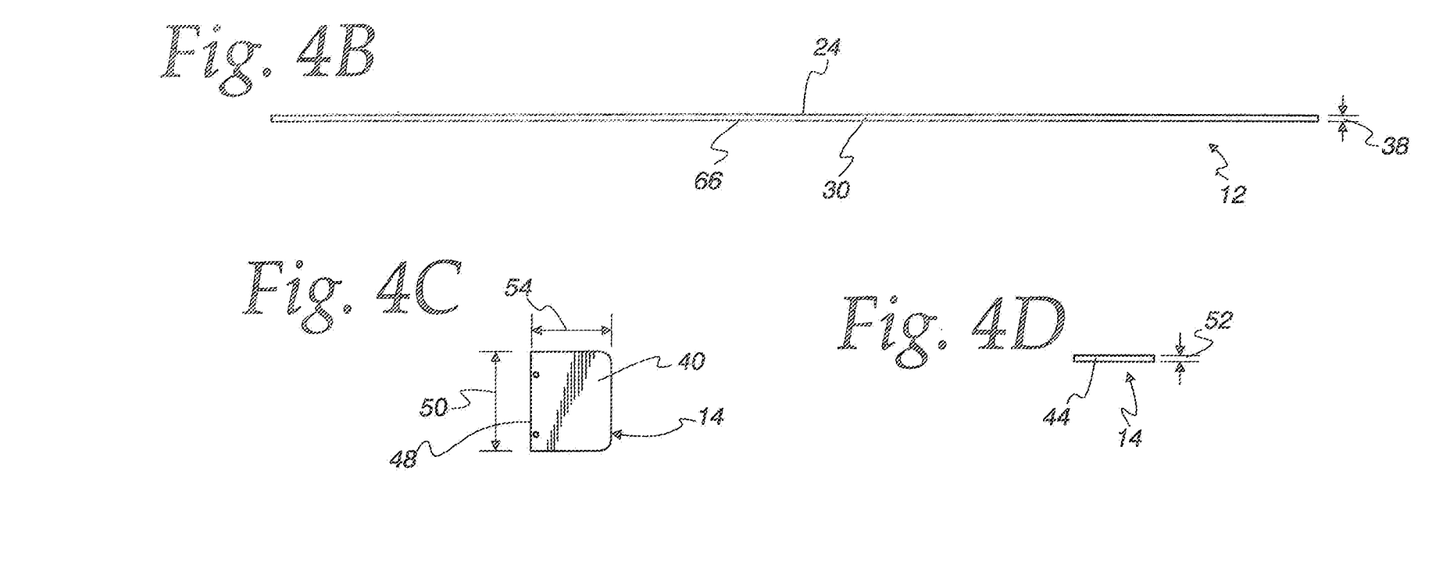
FIG. 4B is a side view of the board component of the fish measuring device of FIG. 1.
FIG. 4C is a side view of the bump component of the fish measuring device of FIG. 1.
FIG. 4D is a top plan view of the bump component of the fish measuring device of FIG. 1.

FIGS. 2-4 illustrate the generally rectangular board 12 and bump 14 component parts of the present disclosure. The board 12 having a top surface 24 whereby the markings 20 are machine engraved, laser etched, attached, inlaid or otherwise disposed, a front or bump end 26, a back or free end 28 and a left and right side (30, 32). The board further having a length 34, a width 36 and a height 38.

The bump 14 has a rear face 40 and a left and right side (42, 44), and a top 46 and a bottom 48. The bump further having a length 50, a width 52 and a height 54. The bump 14 may include fastener holes 56 to work in cooperation with the dowels 58 on the top surface 24 of the bump end 26 of the board 12 to fasten the bump 14 perpendicularly to the board 12. It will be appreciated that other means to couple the bump 14 perpendicularly to the board 12 may be used. It will further be appreciated that either the bump or the board or both may include an aperture or other means to fasten a lanyard or other tether to the boat or other floatable item of the angler.

Figure 5A:
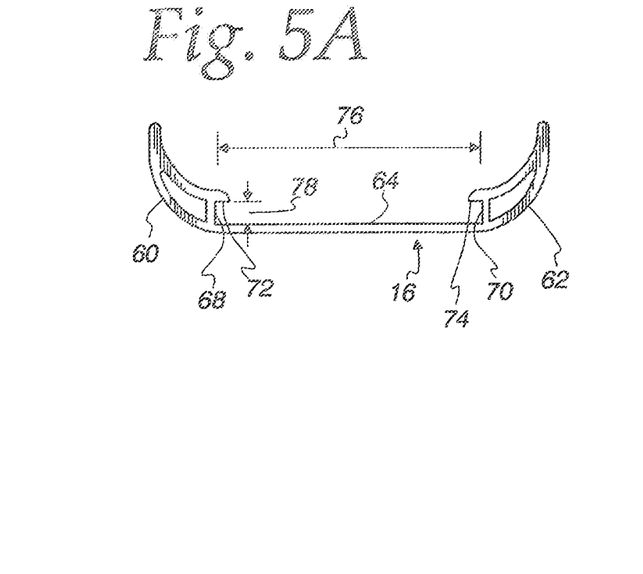
FIG. 5A is a cross-sectional side view of the cradle component of the fish measuring device of FIG. 1.
Figure 5B:
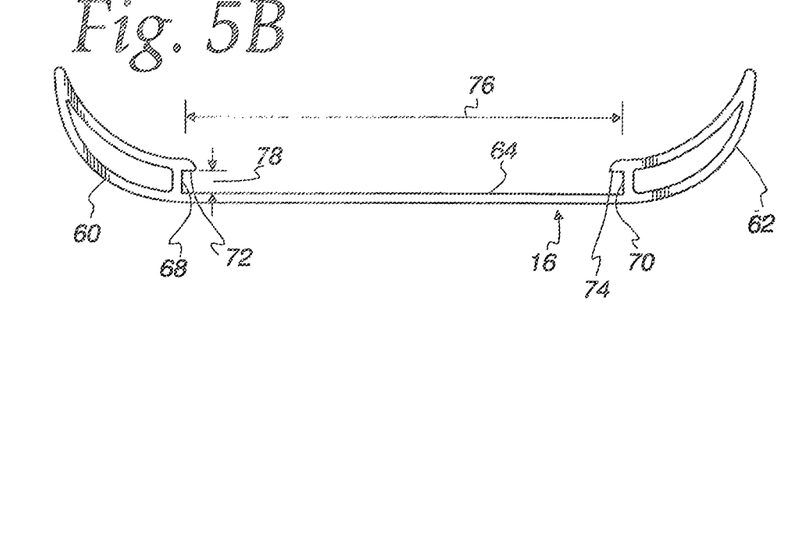
FIG. 5B is a cross-sectional side view of the cradle component of the fish measuring device according to the principles of another embodiment of the present disclosure.

The cradle component of FIG. 1 of the fish measuring device is shown in cross-sectional multiple embodiments of FIG. 5. The cradle 16 includes sloped side wings/supports to provide for gentler fish support and handling. Basically, FIG. 5B is a larger dimensional cradle component of that of FIG. 5A, and as such it is designed to be used with larger boards 12 to measure larger fish. In any event, the cradle 16 of FIG. 5 includes left and right sides (60, 62) and is dimensioned to frictionally engage an associated board 12. In particular, the top surface 64 of the cradle 16 contacts the bottom surface 66 of the board (see FIG. 4B), the left inside wall 68 of the cradle 16 contacts the left side of the board 12, the right inside wall 70 of the cradle 16 contacts the right side 32 of the board 12 and the bottom left and right inside flanges (72, 74) contact the top surface 24 of the board. Furthermore, the width 76 of the top surface 64 of the cradle 16 and the height 78 of the inside walls (68, 70) of the cradle 16 are dimensioned to fit the width 36 and height 38 of the board 12 respectively. As such, the board 12 and cradle 16 are frictionally and slidably engaged. It will be understood that this engagement may take other forms and designs (e.g., affixed, fastened, locked, adhered, biased, sprung, flanged, co-extruded, etc.) so long as the general engagement of the board and cradle is functional. Furthermore, in order to aid in fish measurement, the cradle 16 may extend to the last whole number measurement on the board 12.

Figure 6:
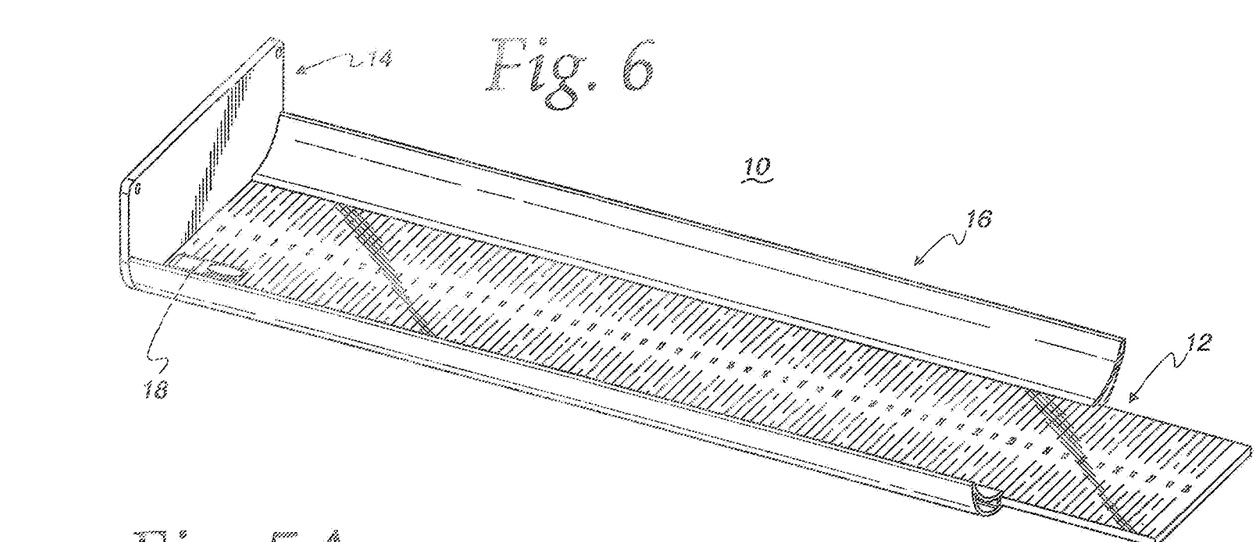
FIG. 6 is a perspective view of the fish measuring device according to the principles of another embodiment of the present disclosure.

It will be appreciated that the fishing measurement device of the present disclosure is not limited to a particular dimension. Indeed, FIG. 6 illustrates an alternate larger fish measuring device 10 including the board 12, the bump 14, and the cradle 16. It will further be appreciated that the QR tab 18 can be incorporated into any sized device.

Figures 7, 8:
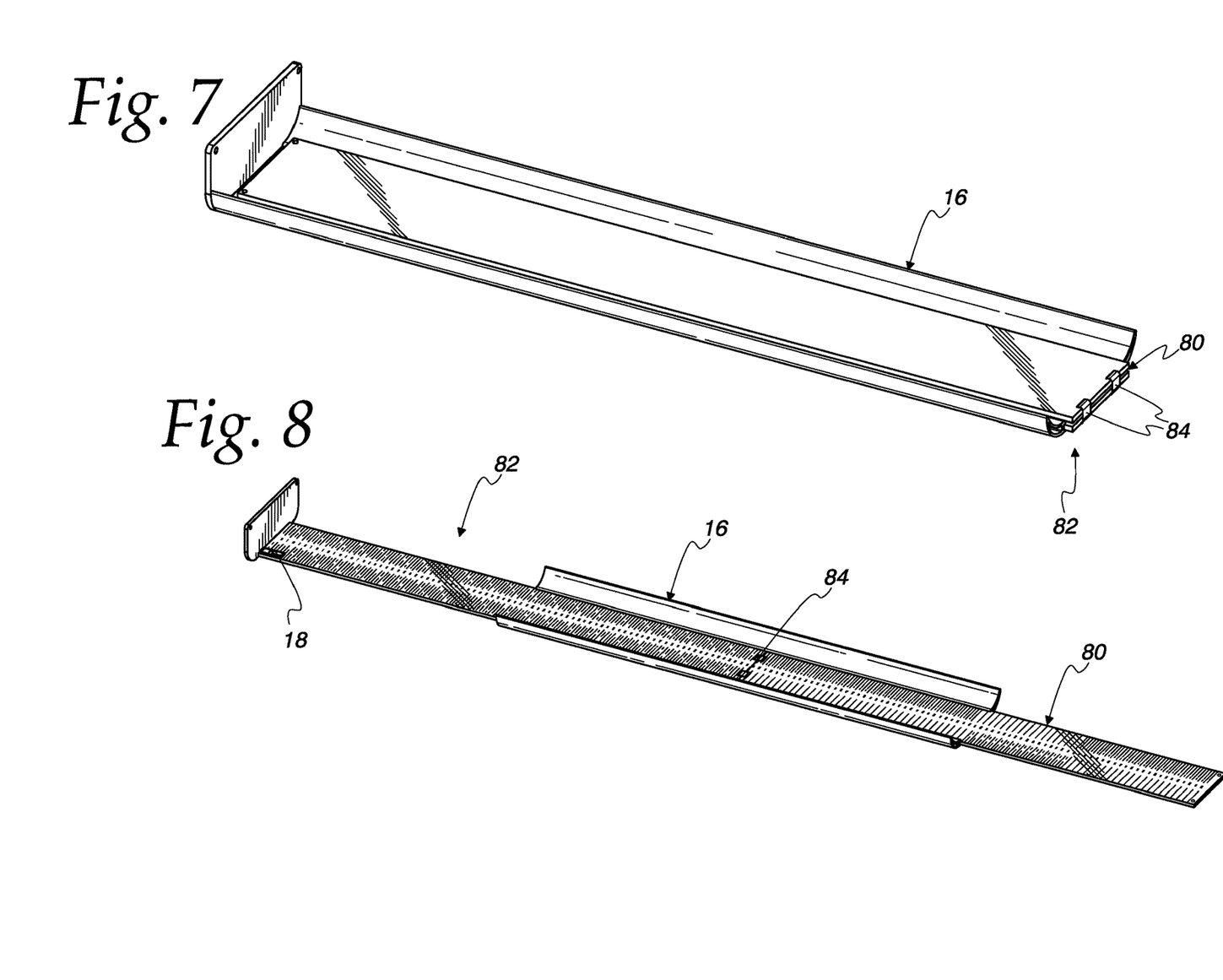
FIG. 7 is a perspective view of the fish measuring device according to the principles of another embodiment of the present disclosure shown in a collapsed state.
FIG. 8 is a perspective view of the fish measuring device of FIG. 7 in an expanded state.

Another alternate embodiment of the fish measuring device of the present disclosure is shown in FIGS. 7-8. This embodiment includes a hinged board consisting of two halves. FIG. 7 illustrates the folded/collapsed state with the second half 80 of the board resting on the first half 82, while FIG. 8 illustrates the unfolded/expanded state with the second half 80 extending the ruled markings of the first half 82. The two halves are coupled and capable of pivoting relative to one another through a set of hinges 84. This particular embodiment is useful for longer fish. Indeed, when the second half 80 is opened/unfolded the cradle 16 seamlessly frictionally engages the second half 80 and the first half 82 (and as previously discussed) at the same time locks the two halves in order to support the fish thereon.

Figures 9, 10, 11:
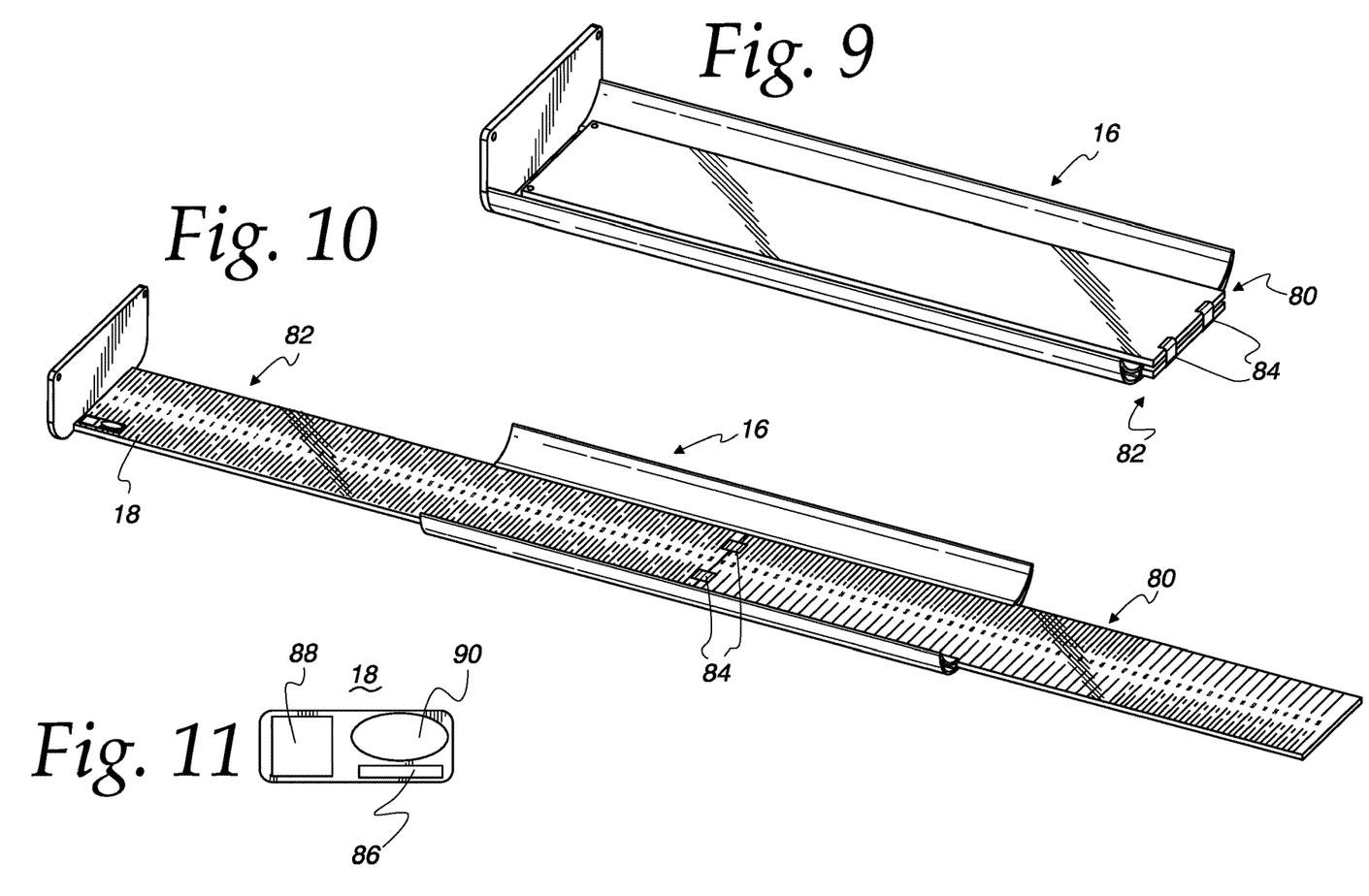
FIG. 9 is a perspective view of the fish measuring device according to the principles of another embodiment of the present disclosure shown in the collapsed state.
FIG. 10 is a perspective view of the fish measuring device of FIG. 9 in an expanded state.
FIG. 11 is a top plan view of a QR tag component of the fish measuring device and method according to the principles of the present disclosure.

As the larger dimensional embodiment of FIG. 6 relates to FIG. 1 so does the alternate embodiment of FIGS. 9-10 relate to FIGS. 7-8. Indeed, regardless of the dimensions, it is the slidably engageable cradle 16 in combination with the rigid hinged board that provides the unique usefulness of the fish measuring device. The curved sleeve (cradle) both holds/supports the fish and locks the linkage/hinge/fold to hold the board flat therebetween.

An enlarged view of the QR tag 18 component of the fish measuring device and method is shown in FIG. 11. In particular, the QR tag is a board identifier with indicia that includes a device serial number 86, a quick response code 88 and a manufacturer logo/trademark 90. This QR tag ensures that each fishing measurement device is individually serialized and embedded with a unique SQRC code. The code can be scanned at tournament check-in to ensure anglers are using an approved device, and can also be scanned through photographs to ensure that anglers are using the same board that was scanned at check-in. The SQSC tag has password protected information that can only be read by using an appropriate scanner. As such, they cannot be replicated. Quick response codes and their respective scanners and background processing are well known in the art and are incorporated herein. It is the unique process of using same within a photograph downloaded to server to authenticate the size of a catch fish that provides the novelty of the process. The dimension of the tag 18 is held to a precise measurement, (i.e., 2.000"), so that any fish photo can be scaled by using the length of the tag as a reference. This basically prevents anglers from modifying or creating counterfeit devices to make fish appear bigger than they really are. This essentially creates a fraud protection system that helps level the playing field for tournament participants.

Figures 12, 13, 14:
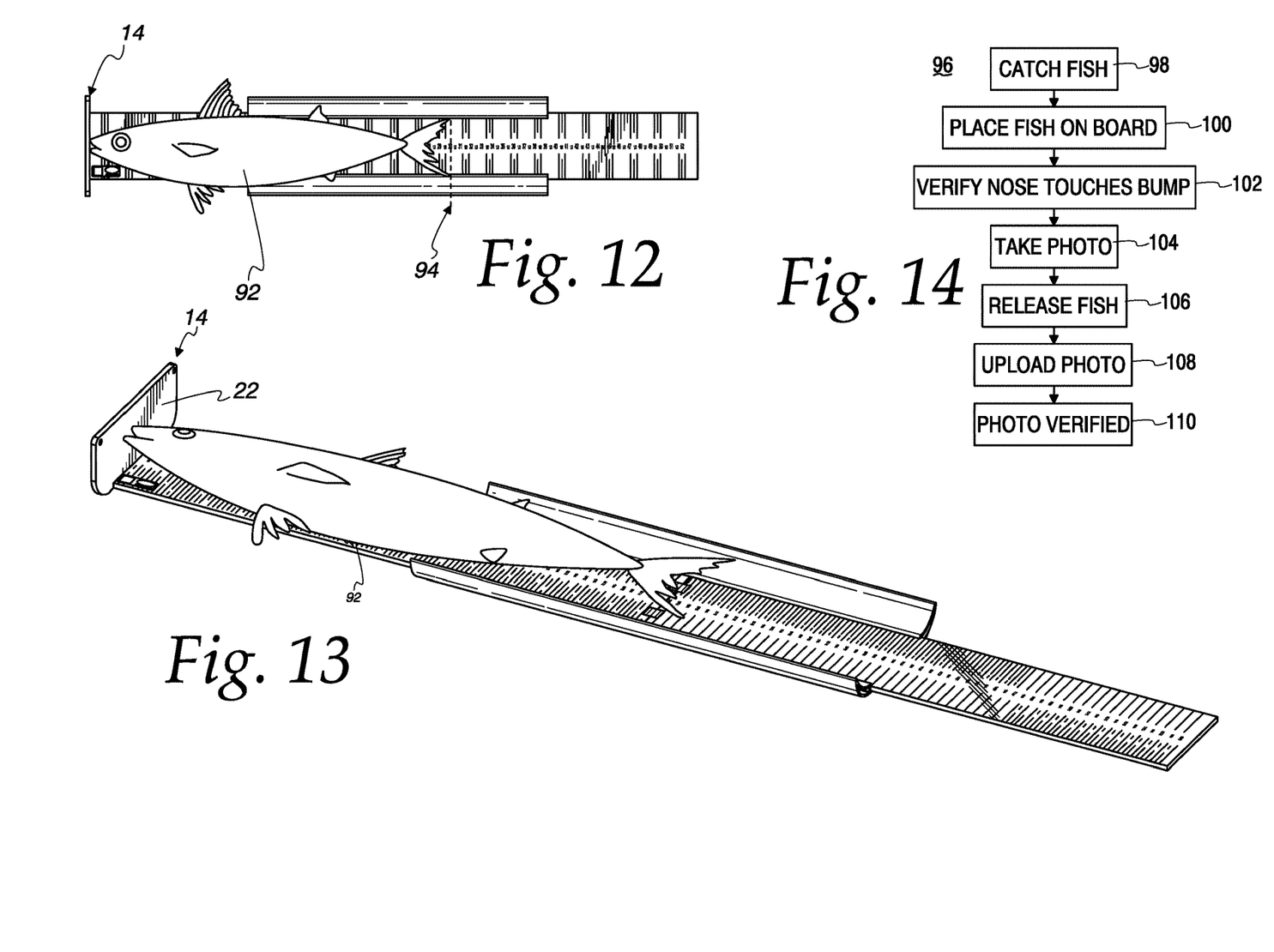
FIG. 12 is a top plan view of a fish being measured on the fish measuring device according to the principles of the present disclosure.
FIG. 13 is a perspective view of the fish and fish measuring device of FIG. 12.
FIG. 14 is a simplified logic flow diagram of the fish measuring method according to the principles of the present disclosure.

FIGS. 12-13 illustrate the fish measuring device and method in use. In particular, the caught fish 92 is placed on the board with its head facing towards the bump. The fish 92 is then slid towards the bump until its closed mouth touches the face 22 of the bump. The length 94 of the fish 92 is then noted by the end of the tail fin against the ruled markings of the board.

The fish measurement method of the present disclosure will now be described relative to the logic flow of FIG. 14. This process incorporates a QR code and photo verification to authenticate the length of each catch. All boards are embedded with an asset tag containing a QR code unique to that particular board whereby each board is serialized and given its own unique QR code. After the angler and the board have gone through the check-in procedure the tournament fishing measurement process 96 begins with a caught fish 98. After removal of the hook, that fish is placed 100 on the fish measurement device 10 and the angler verifies 102 that the nose of the fish touches the bump face 22. The angler then notes the length of the fish by the end of the tail against the markings on the board and takes a photo 104. The angler verifies that the dimension of the fish is clearly in the photo, along with the tournament identifying badge. The fish is then released 106, the photo uploaded 108 to the TMS and is verified 110.

While the previously discussed embodiments have been shown and described with a frictionally and slidably engaged board 12 and cradle 16, the board and cradle, as previously noted, may indeed take on other forms and designs. By way of example, the board and cradle sections may be co-extruded, of one mold and/or the like. Such a design will now be described with the figures that follow.

Figure 15:
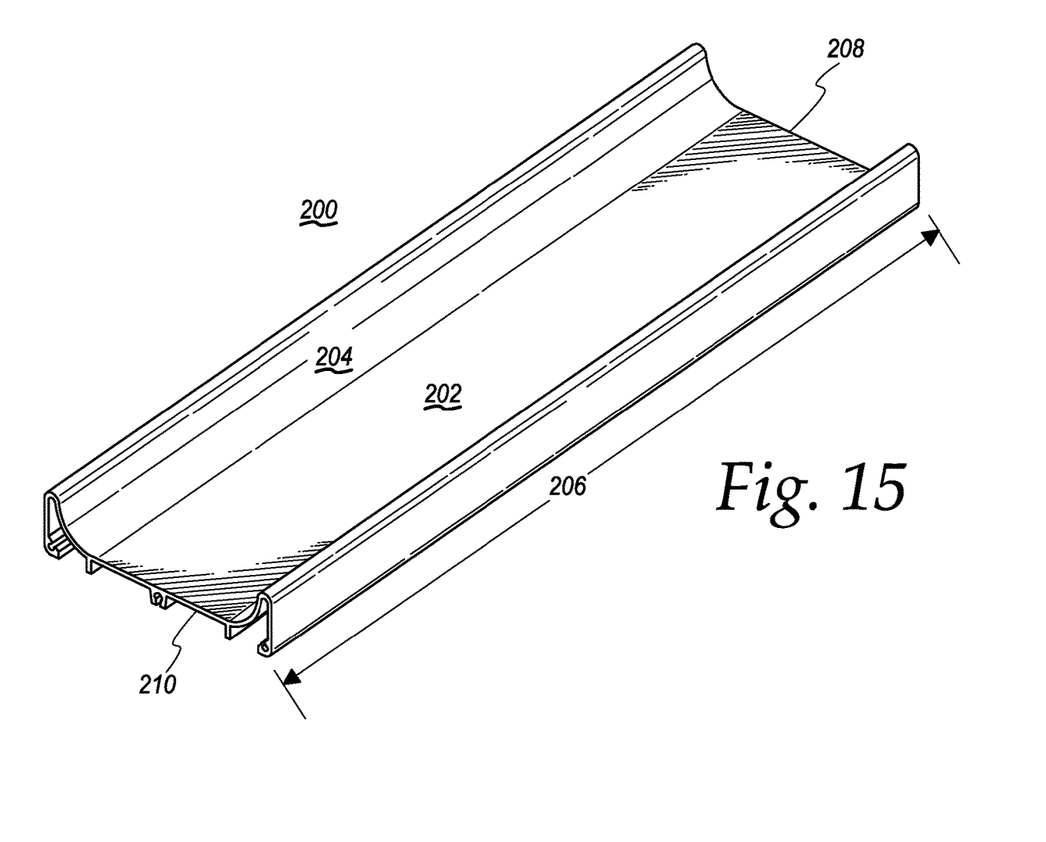
FIG. 15 is a perspective view of the main body of an alternate embodiment of the fish measuring device according to the principles of the present disclosure.

FIG. 15 illustrates one such alternate embodiment. In particular, the device 200 is shown in a perspective view having a generally flat main section 202 and curved side supports 204 traversing a length 206 between a front end 208 and a rear end 210. The end of the device is better shown in the cross-sectional dimensional illustrations of FIG. 16. Here there is shown a width 212 and a height 214. The curved side supports 204 define the corner widths 216, flat section width 218 and flat section thickness 220.

Figure 17:
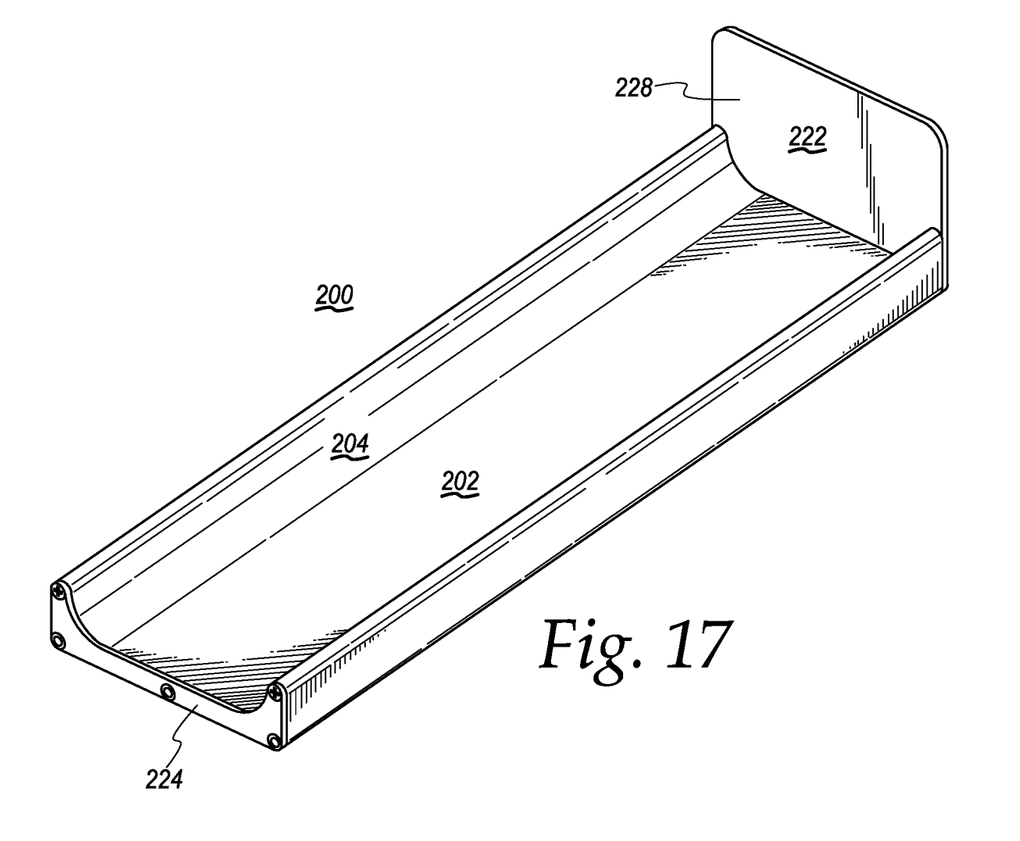
FIG. 17 is a perspective view of the alternate embodiment of the fish measuring device according to the principles of the present disclosure.
Figure 18:
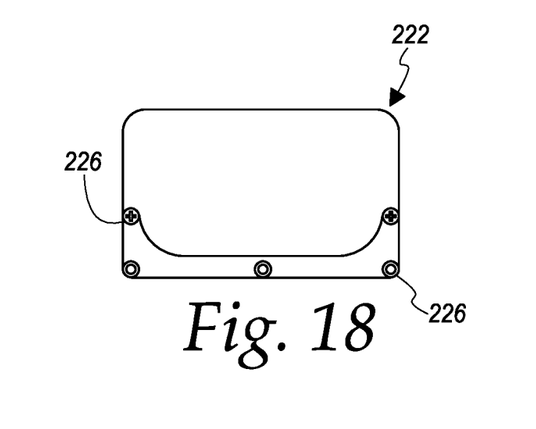
FIG. 18 is a frontal view of the fish measuring device of FIG. 17.
Figure 19:
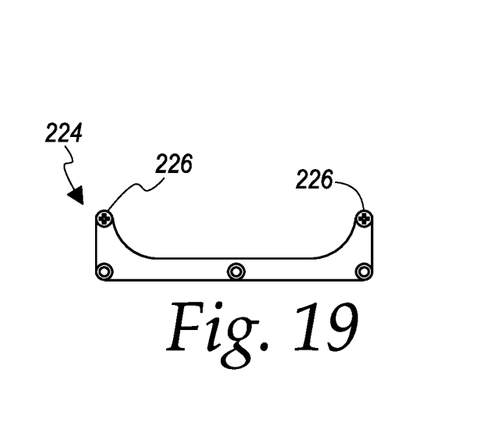
FIG. 19 is a rear view of the fish measuring device of FIG. 17.

FIG. 17 shows the device 200 with a front bump or fence 222 and a rear cap 224. The frontal view of FIG. 18 shows the bump 222 affixed to the board with flush rivets 226. Similarly, the rear view of FIG. 19 shows the cap 224 affixed to the board with flush rivets 226. It will be appreciated that such fixation may be accomplished via any suitable fastening means.

This alternate embodiment of the fish measuring device is used as described previously herein. In particular, the caught fish is placed on the board with its head facing towards the bump. The fish is then slid towards the bump until its closed mouth touches the face 228 of the bump 222. The length of the fish is then noted by the end of the tail fin against the ruled markings of the board.

Figure 20:
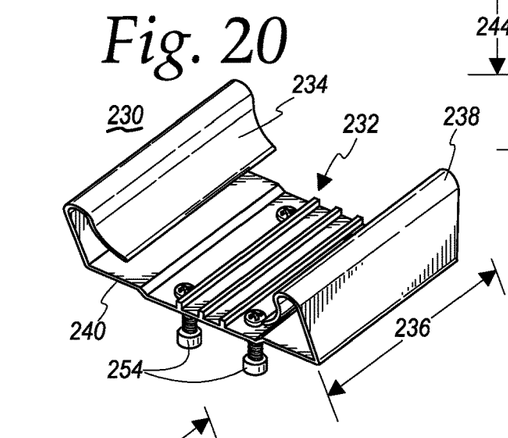
FIG. 20 is a perspective view of the mount for the fish measuring device according to the principles of the present disclosure.

While the fish measuring device of the present disclosure is easily used while freestanding it may be equally be used while attached to an underlying support surface. FIGS. 20-25 illustrate such a preferred mounting assembly. Turning first to FIG. 20, the mount 230 is shown in a perspective view having a generally flat main section 232 and curved sides 234 traversing a length 236 between a front end 238 and a rear end 240. The end of the mount 230 is better shown in the cross-sectional dimensional illustrations of FIG. 21. Here there is shown a width 242 and a height 244. The curved sides 234 define the corner widths 246, flat section width 248 and an open section thickness 250.

Figure 16:
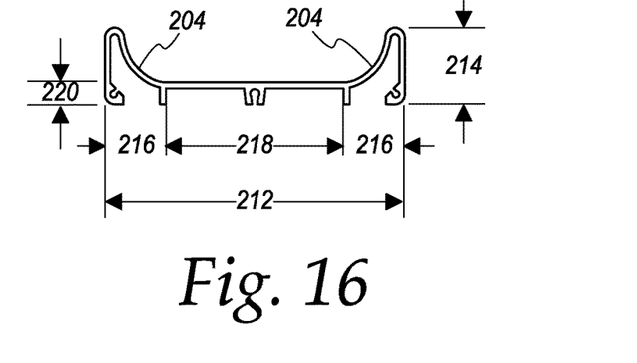
FIG. 16 is an end view of the main body of FIG. 15.
Figure 21:
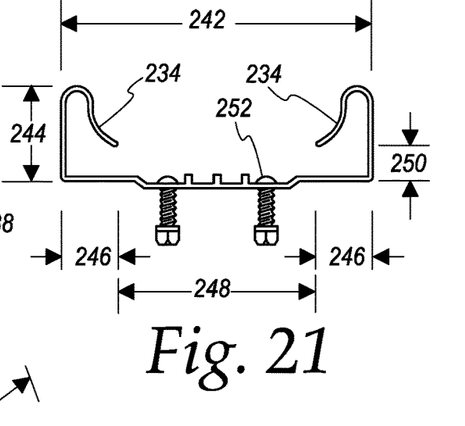
FIG. 21 is a frontal view of the end of FIG. 20.
Figure 22:
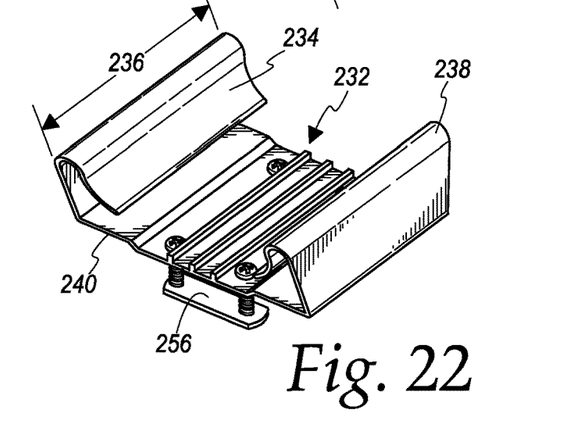
FIG. 22 is a perspective view of the mount for the fish measuring device according to the principles of the present disclosure using an alternate mounting assembly.
Figure 23:
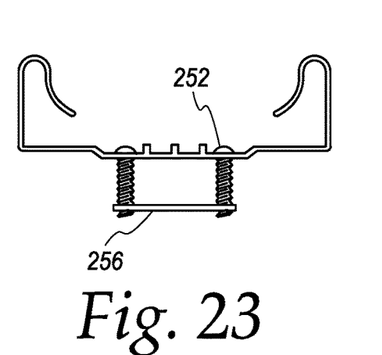
FIG. 23 is a frontal view of the end of FIG. 22.

The dimensions of the mount 230 as shown in FIG. 21 are bigger than the dimensions of the board 200, as shown in FIG. 16. As such, the board is received by and frictionally secured by and within the mount 230.

Figure 24:
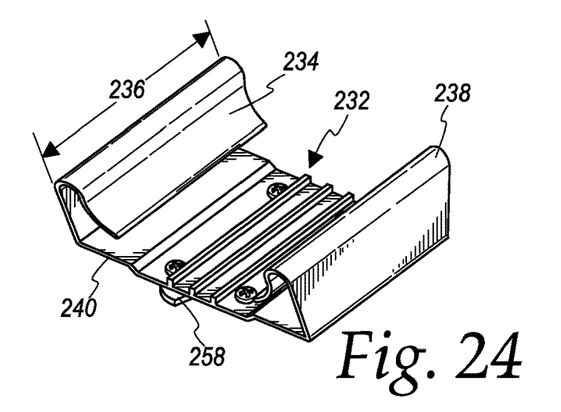
FIG. 24 is a perspective view of the mount for the fish measuring device according to the principles of the present disclosure using an alternate mounting assembly.
Figure 25:
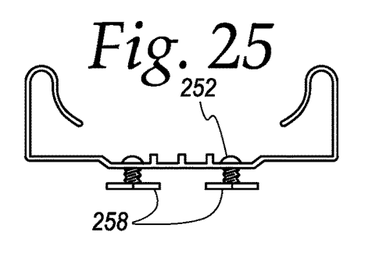
FIG. 25 is a frontal view of the end of FIG. 24.

The mount 230 is coupled to an underlying support surface, such as a watercraft, dock, etc. via bolts 252 (see FIG. 21) and cooperating locknuts 254 (FIG. 20). Alternatively, a dual weld nut 256 (FIGS. 22 and 23) provides mounting to certain so-called "T" track configurations, while the weld nuts 258 of FIGS. 24 and 25 provide mounting to any "T" track. It will be appreciated that other coupling means may be used so long as the board remains slidably engageable with the mount.

Figure 26:
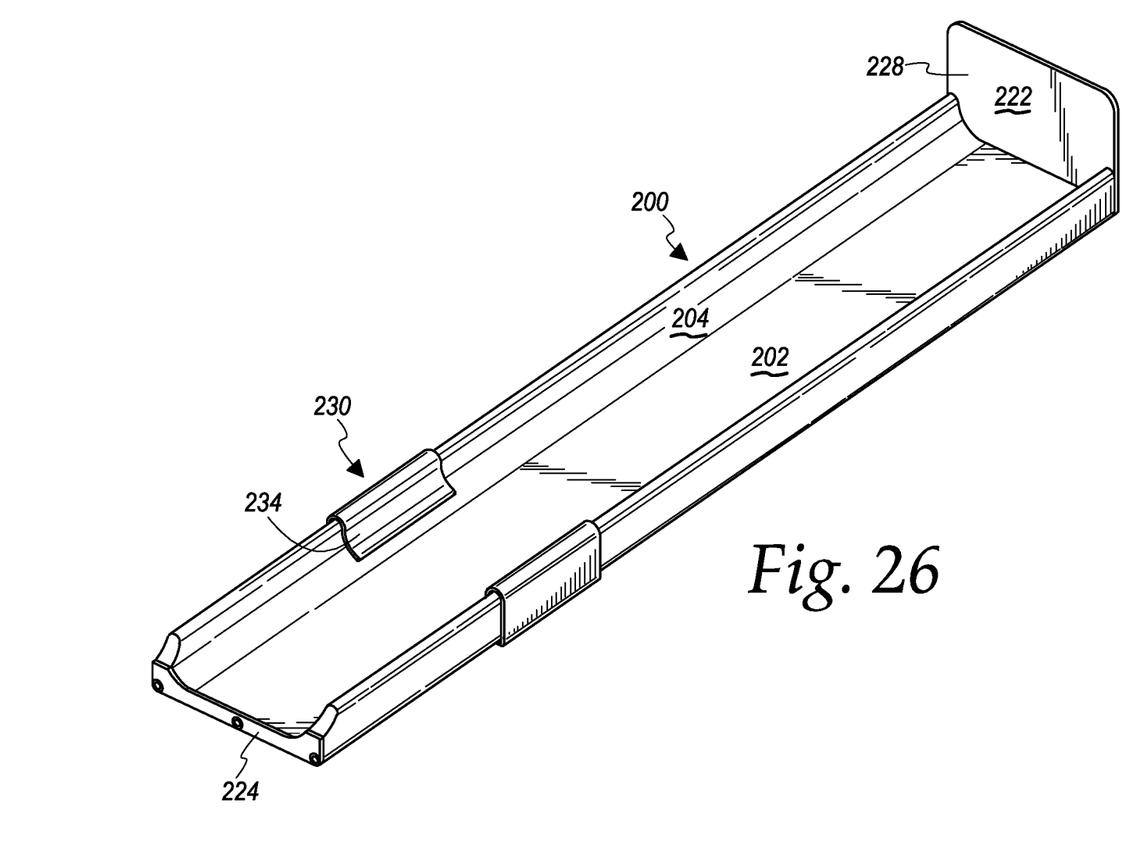
FIG. 26 is a perspective view of the fish measuring device coupled to the mount in accordance with the principles of the present disclosure.
Figure 27:
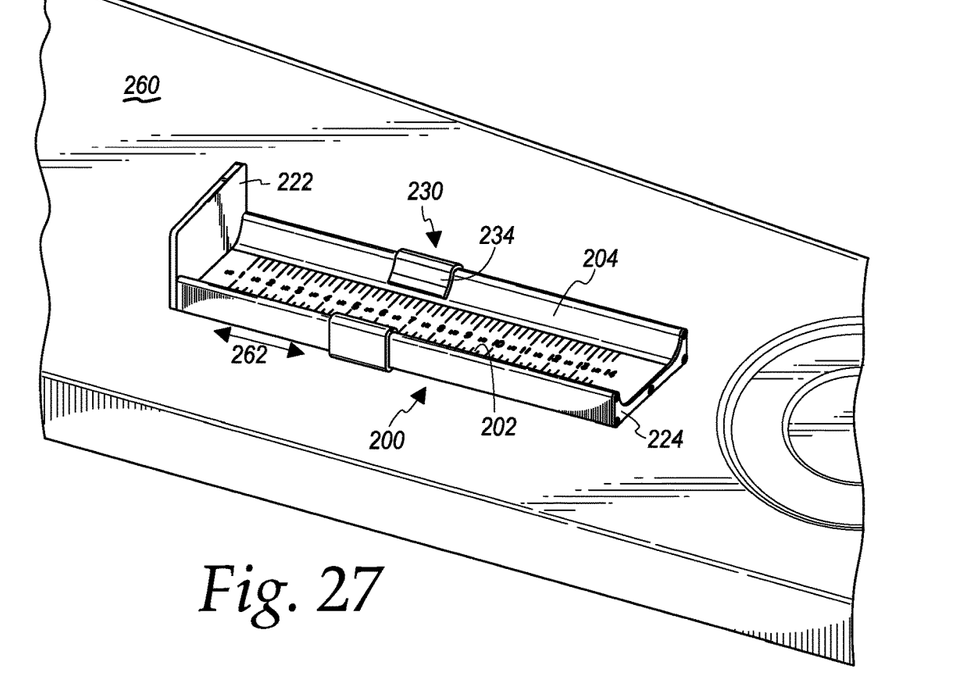
FIG. 27 is a top plan view of the fish measuring device coupled to the mount atop an underlying support surface.

FIG. 26 illustrates a perspective view of the bump board 200 coupled to the attachment device 230 in a slidable engagement. FIG. 27 illustrates a top view of the bump board 200 coupled to the attachment device 230 attached to an underlying support surface (here a kayak) 260. The board is movable 262 within the attachment device 230 but remains snug.

The support attachment design, and the position-able feature thereof can be utilized for other purposes. For example, a position-able tournament identification tag assembly may be utilized by this slidable feature. More specifically, FIG. 28 generally shows the same type of design as shown for the mount 230 of FIG. 20. Indeed, the identification device 264 is shown in a perspective view having a generally flat section 266 and curved sides 268 traversing a length 270 between a front end 272 and a rear end 274. While the device 264 does not have underlying support surface means, it does include an identifier plate or tag 276 hinged 278 near one side.

Figure 28:
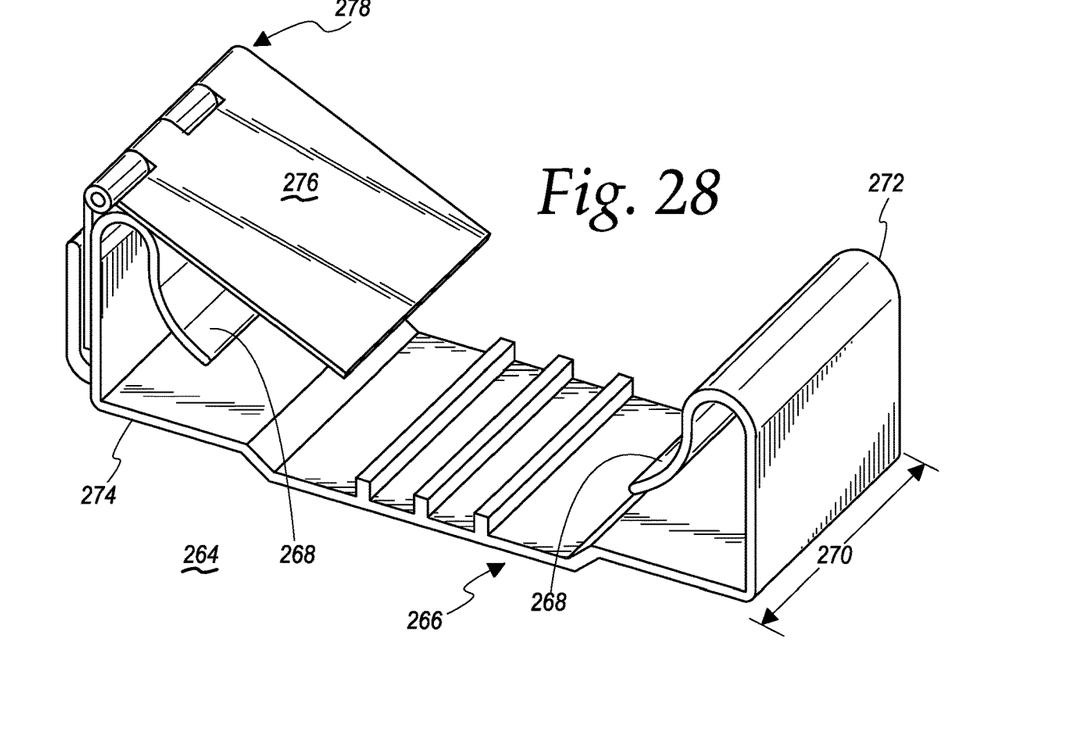
FIG. 28 is a perspective view of an identification for the fish measuring device according to the principles of the present disclosure.

The cross-sectional dimensions of the identification device 264 are similar to those noted in FIG. 21. As such, the bump board is received by and frictionally secured by and within the identification device 264.

Figure 29:
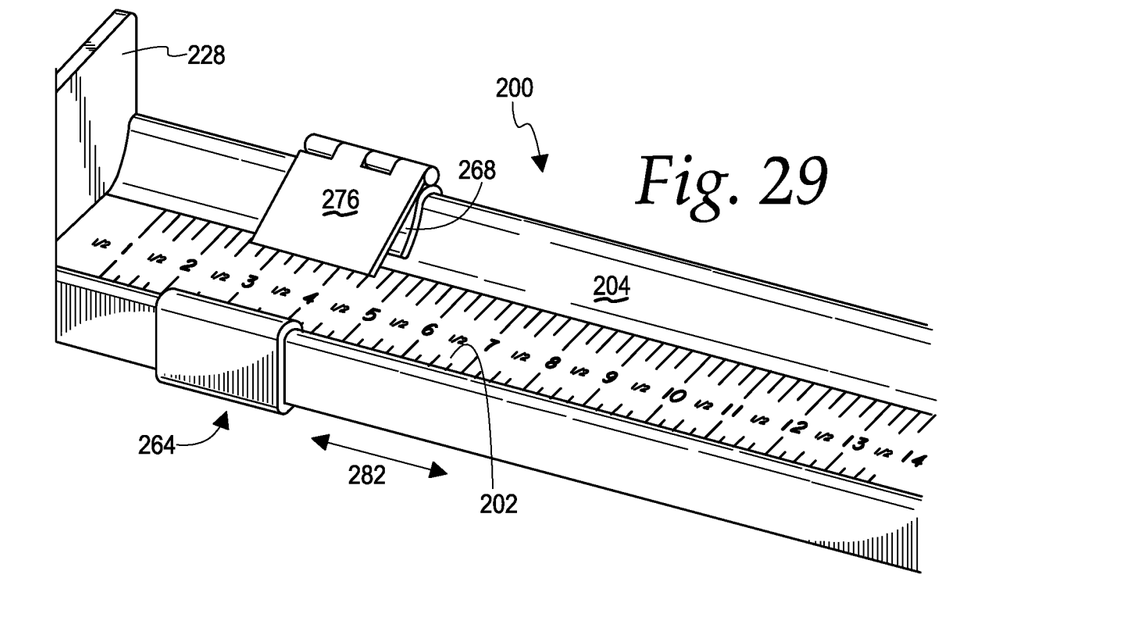
FIG. 29 is a perspective view of the fish measuring device coupled to the closed identification device according to the principles of the present disclosure.
Figure 30:
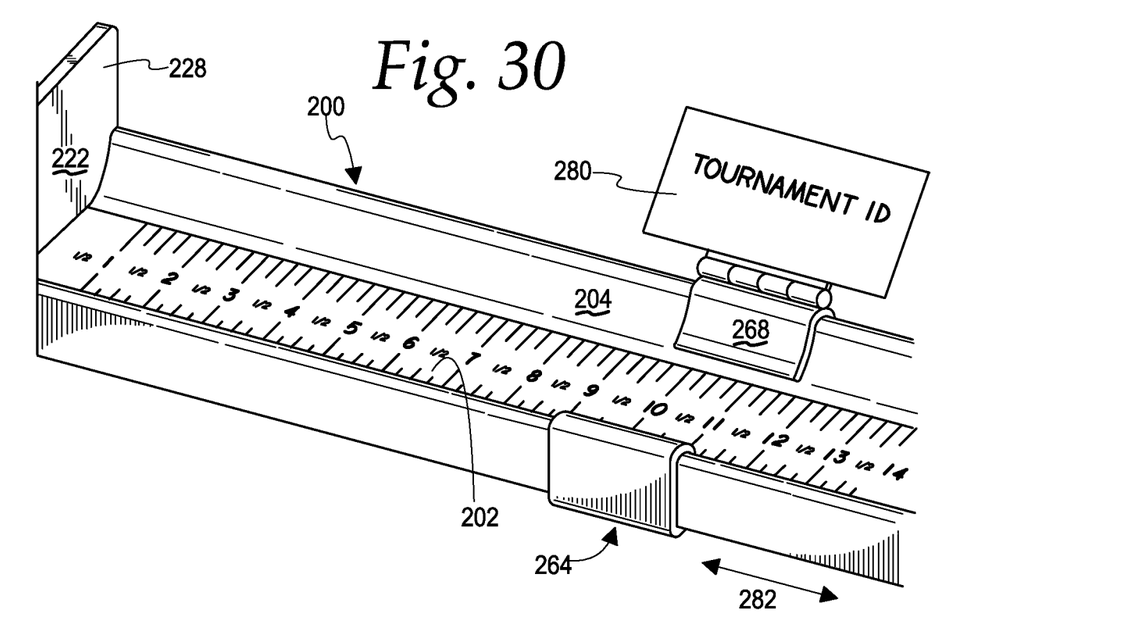
FIG. 30 is a perspective view of the fish measuring device coupled to the open identification device according to the principles of the present disclosure.

FIGS. 29 and 30 illustrate a perspective view of the bump board 200 coupled to the identification device 264 in a slidable engagement. FIG. 29 shows the identifier 276 in the down or stored position while FIG. 30 shows the identifier flipped-up and in use position with an additional information card 280 or the like attached thereto. Such card, which generally identifies the fisherman in a tournament, may be attached via hook and loop fasteners or any other means. In use, the identification device 264 is position-able 282 (as before) along the board 200 to enable a proper fish photo. The flip-up feature provides identification visibility without obscuring either fish or measurement scales on the bump board.

It will be appreciated that the slidable assembly, whether used to mount the board and/or used for the identifier, can be utilized by any of the board embodiments. In other words, the assembly is capable of engagement with the two-piece board/cradle as well as the one-piece design.

The foregoing detailed description has been given for clearness of understanding only and no unnecessary limitations should be understood therefrom. Accordingly, while one or more particular embodiments of the disclosure have been shown and described, it will be apparent to those skilled in the art that changes and modifications may be made therein without departing from the invention in its broader aspects, and, therefore, the aim in the appended claims is to cover all such changes and modifications as fall within the true spirit and scope of the present disclosure.

What is claimed is:

1. A fish measuring system comprising:
   a board having a generally flat main section with a top surface and curved side supports defining a board cross-sectional dimension and traversing a length between a front end and a rear end;
   ruled markings disposed on said top surface of said board whereby said markings start near said front end;
   a bump having a front side, said bump positioned perpendicularly on said board whereby said front side aligns with a zero marking; and
   a position-able and mountable assembly having a generally flat main section and curved sides defining an assembly cross-sectional dimension and traversing a length between a front end and a rear end wherein said assembly cross-sectional dimension is larger than said board cross-sectional dimension.

2. The fish measuring system as defined in claim 1 wherein said board is frictionally engaged within said assembly.

3. The fish measuring system as defined in claim 1 wherein said assembly is a mounted upon an underlying support surface.

4. The fish measuring system as defined in claim 1 wherein said assembly includes a user identifier.

5. The fish measuring system as defined in claim 4 wherein said identifier is pivotable from a stored position to a use position.

6. The fish measuring system as defined in claim 1 wherein said board main section and said board side supports are frictionally engaged.

7. A fish measurement system comprising:
a board having a generally flat main section with a top surface and curved side supports defining a board cross-sectional dimension and traversing a length between a front end and a rear end;
ruled markings disposed on said top surface of said board whereby said markings start near said front end;
a bump having a front side, said bump positioned perpendicularly on said board whereby said front side aligns with a zero marking; and
a position-able mount assembly having a generally flat main section and curved sides defining a mount assembly cross-sectional dimension and traversing a length between a front end and a rear end wherein said mount assembly cross-sectional dimension is larger than said board cross-sectional dimension.

8. The fish measuring system as defined in claim 7 wherein said board is frictionally engaged within said mount assembly.

9. The fish measuring system as defined in claim 7 wherein said board main section and said side board supports are frictionally engaged.

10. A fish measurement system comprising:
a board having a generally flat main section with a top surface and curved side supports defining a board cross-sectional dimension and traversing a length between a front end and a rear end;
ruled markings disposed on said top surface of said board whereby said markings start near said front end;
a bump having a front side, said bump positioned perpendicularly on said board whereby said front side aligns with a zero marking; and
a position-able user identifier assembly having a generally flat main section and curved sides defining a mount assembly cross-sectional dimension and traversing a length between a front end and a rear end wherein said mount assembly cross-sectional dimension is larger than said board cross-sectional dimension.

11. The fish measuring system as defined in claim 10 wherein said board is frictionally engaged within said identifier.

12. The fish measuring system as defined in claim 10 wherein said board main section and said board side supports are frictionally engaged.

13. The fish measuring system as defined in claim 10 wherein said identifier is pivotable from a stored position to a use position.

\* \* \* \* \*